Patented Feb. 28, 1933

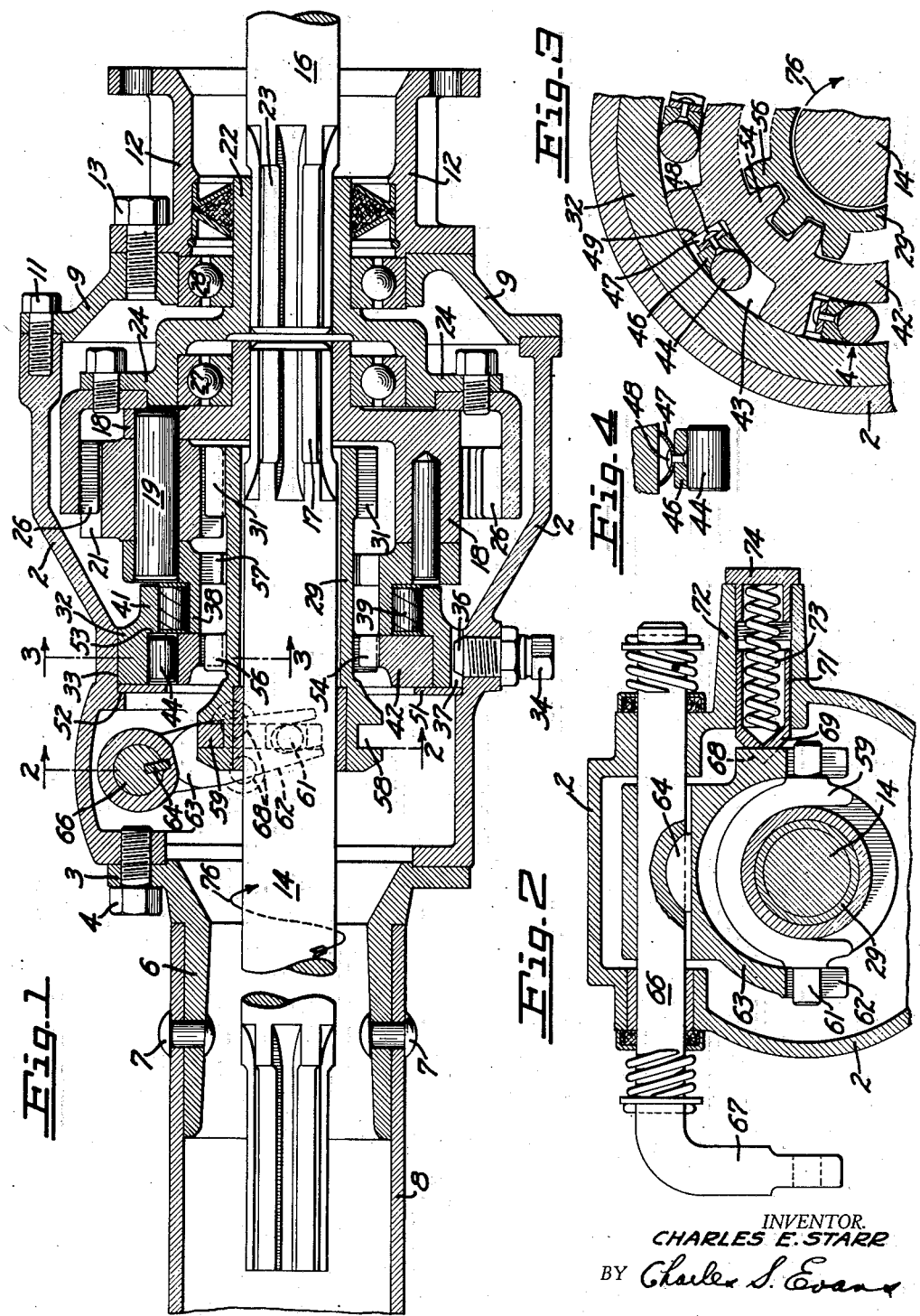

1,899,401

UNITED STATES PATENT OFFICE

CHARLES E. STARR, OF WHITTIER, CALIFORNIA

TRANSMISSION GEARING

Application filed April 11, 1931. Serial No. 529,346.

My invention relates to transmissions for power driven vehicles, and particularly to a transmission incorporating a freewheeling clutch.

It is among the objects of my invention to provide a transmission having an overdrive gearing operating in conjunction with an overrunning clutch.

Another object of my invention is the provision of an overrunning clutch adapted to be positioned in the torque tube of an automobile immediately ahead of the rear axle, so as to disconnect all propulsion mechanism from the rear axle when the vehicle is coasting.

A further object of my invention is the provision of a transmission of the character described which may readily be inserted as an auxiliary mechanism in the propulsion system of a vehicle.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a vertical sectional view of my transmission as inserted in the torque tube of an automobile.

Figure 2 is a detail vertical sectional view showing the sleeve shifting mechanism; the plane of section being indicated by the line 2—2 of Figure 1.

Figure 3 is a fragmentary vertical sectional view showing the freewheeling clutch, taken in a plane indicated by the line 3—3 of Figure 1.

Figure 4 is a fragmentary sectional view showing the mounting of one of the freewheeling clutch rollers. The direction in which the view is taken is indicated by the arrow 4 of Figure 3.

On descending grades or on level roads, greatly increased coasting speeds may be obtained from an automobile by releasing the clutch. This action cuts off the retarding action of the motor and permits the car to proceed at increased momentum. However, the drive wheels must supply the energy necessary to revolve the propeller shaft, speed change gearing and clutch parts. In the event that the road is level or has only a slight declension, the power required to overcome the rotational resistance of these parts quickly dissipates the impellent force.

The transmission of my invention by means of its freewheeling clutch is adapted to overcome this resistance by permitting the release of all driving mechanism ahead of the rear axle whenever the rotational speed of the rear wheels exceeds that of the propeller shaft. The provision of overdrive gearing in the transmission lowers the engine-to-car-speed ratio, thus affording a considerable saving in fuel, and, due to the slower rotational speed of the driving mechanism, insures longer life for the working parts.

In terms of broad inclusion, the transmission embodying my invention comprises a drive shaft and a driven shaft. A ring gear is provided and is mounted for rotation with the driven shaft, and a pinion is provided meshing with the ring gear; the pinion being mounted on the drive shaft for planetary movement thereabout. A sun gear mounted for unidirectional rotation is provided, and is meshed with the planetary pinion; the unidirectional rotation of the sun gear being effected by an overrunning clutch. Means are also provided for locking the sun gear, pinion, and pinion mounting together.

In the preferred construction the overrunning clutch comprises a fixed bearing ring in which a rotatable ring having a plurality of peripheral notches is journaled. Means, arranged in the ring notches, are provided for allowing unidirectional rotation of the ring. The sun gear is preferably mounted on a slidable sleeve having clutch teeth meshed with complementary teeth formed on the rotatable ring of the overrunning clutch. By this construction unidirectional rotation of the sun gear is effected by the action of the overrunning clutch. Interlocking of the sun gear, pinion, and pinion mounting is preferably effected by shifting the sleeve so that the sun gear also meshes with complementary clutch teeth formed on the pinion mounting; this shifting also disengaging the clutch teeth on the sleeve from the teeth on the rotatable ring of the overrunning clutch.

In greater detail my transmission comprises a housing of which the gear case 2 is a part. The transmission is preferably installed in the torque tube of an automobile, and to this end a flange 3 is provided; the flange being secured to the gear case by means of the cap screws 4. The flange is provided with an annular projection 6 adapted to be secured, as by means of the rivets 7, to the severed end of the torque tube 8. The opposite end of the case 2 is provided with a plate 9, secured to the gear case by means of the capscrews 11. A spacing sleeve 12, secured to the plate 9 by the capscrews 13, is bolted to the rear axle housing in the usual manner.

A drive shaft 14 and a driven shaft 16 are positioned within the housing, and a planetary gearing is provided for connecting these shafts. Secured to the drive shaft 14 thru the splines 17 is a spider 18, upon which is journaled, by means of the pin 19, a pinion 21. Preferably a plurality of these pinions are provided arranged circumferentially about the drive shaft. A hub 22, secured thru the splines 23 to the driven shaft 16, is provided with a flange 24 upon which is mounted the ring gear 26 meshing with the pinion 21. Suitable bearings 27 and 28, are provided for journaling the ring gear in the housing, and the spider in the ring gear hub, respectively. These bearings also serve to maintain the drive shaft and the driven shaft in axial alinement.

Freely journaled and axially slidable on the drive shaft 14 is a sleeve 29 provided at one end thereof with a gear 31, which is the sun gear of the planetary gear system. The sun gear 31 is meshed with the pinion 21, and since the ring gear 26, pinion 21 and sun gear 31 are in mesh rotation of one will cause rotation of the others; the resulting movement involving a planetary action if the sun gear is held against rotation. In the preferred form, as shown, the arrangement of the parts is such as to provide an overdrive of the driven shaft, preferably at a ratio of 1 to 1.333. Of course, it is understood that other ratios may be employed. Also, by a slight change of structure, that is, by holding the pinion mounting against rotation and by driving thru the sun gear instead of thru the pinions a reduction gear transmission may be provided.

Means including an overrunning clutch are provided for permitting unidirectional rotation of the sun gear 31. A bearing ring 32 is seated in a cylindrical bore 33 formed in the housing, and a locking screw 34 is provided, the tapered end 36 of which seats in a notch 37 formed in the periphery of the bearing ring to securely lock it in place. A projection 38 of the spider forms the inner race for a roller bearing 39, and the projection 41 of the bearing ring forms the outer race. This roller bearing serves to support one end of the spider, and together with the bearings 27 and 28 maintains the spider in axial alinement with the shafts.

A slip ring 42 is journaled in the bearing ring 32, and is provided with a plurality of peripheral notches 43 in which are disposed the rollers 44; the depth of the notches being greater at one end than at the other. As viewed in Figure 3, free rotation of the slip ring 42 is afforded in a counter-clockwise direction, but clockwise rotation of the ring is prevented due to the fact that the rollers are forced to the shallow end of the notches thereby locking the ring against rotation in that direction. Each of the rollers 44 is provided with a bearing block 46 in which it is adapted to seat, and a leaf spring 47, secured to the block by means of the rivet 48, is adapted to bear against the side 49 of the notch to urge the rollers into engagement with the bottom of the notch and the face of the ring journal. A washer 51, secured between the bearing ring 32 and a shoulder 52 formed in the housing, serves to prevent endwise movement of the rollers in one direction, and the shoulder 53 performs the same function in the other direction. Suitable clutch teeth 54, formed in the inner bore of the ring 42, are adapted to mesh with clutch teeth 56 formed on the sleeve 29. This connection serves to provide an operable relationship between the sun gear and the fixed element or bearing ring 32, and permits rotation of the sun gear only in one direction thru the medium of the freewheeling clutch just described.

Means are provided for locking the gearing for unitary rotation, and for simultaneously disconnecting the overrunning clutch. Suitable clutch teeth 57 are provided on the spider 18 and are positioned for alinement with the teeth of the sun gear 31 and the teeth of the pinions 21. It will be seen from Figure 1 that shifting the sun gear to also engage the teeth 57 locks the pinions to the spider and permits the gear train to revolve as a unit. The shifting of the sleeve carrying the sun gear also causes the sleeve teeth 56 to disengage the teeth 54 of the slip ring 42, thereby disconnecting the overrunning clutch and rendering it inoperative when the gearing is locked.

Means are provided for shifting the sleeve, and means are provided for latching the sleeve in a selected position. A groove 58 formed at one end of the sleeve is adapted to seat a half collar 59 having suitable pins 61 engaged by the forked ends 62 of a shifting yoke 63. The yoke is secured by a key 64 to a shaft 66 journaled in the gear case 2, and has at one end thereof a depending portion forming a crank 67. Suitable means, such as a pull rod, may be provided for connecting this crank to a shift lever located adjacent the driver's seat.

Formed on a flat portion of one of the arms of the yoke 63 are a pair of conical depressions 68 in which the pointed end 69 of a latch bolt 71 is adapted to seat. The latch bolt is slidably positioned in a tubular projection 72 extending from the gear case, and is provided with a coil spring 73 for urging the latch bolt against its seat. A threaded plug 74 serves to retain the spring in position. The latch bolt seats correspond to the two operating positions of the sleeve 29, and serve to insure that the sleeve is latched in either one of these positions.

*Operation.*—With the gearing latched in the overdrive position as indicated in Figure 1, and assuming that torque is applied to the drive shaft 14 in the direction of the arlow 76, rotation of the connected spider 18 is effected to carry the pinion 21 about the drive shaft with a planetary movement. Rotation of the ring gear 26, however, is resisted by the rear wheels of the vehicle. This action causes the pinion 21 to tend to rotate the sun gear 31 in the direction of rotation of the drive shaft. Consequently, the connected slip ring 42 tends to rotate in the same direction, or clockwise as viewed in Figure 3. The spring pressed rollers 44 in the overrunning clutch, however, are wedged in the notches 43 and resist rotation in this direction; any tendency on the part of the slip ring 42 to rotate merely increasing this wedging action. As a result, the sun gear 31 is held against rotation and the pinion 21 is caused to planetate thereabout to rotate the ring gear 26 faster than the driving shaft 14 with a consequent overdriving of the driven shaft 16.

Should the torque be applied to the driven shaft, by virtue of the car coasting with the engine throttled down, viz., when the speed of the driven shaft 16 exceeds the speed of the driving shaft 14, the action of the planetary gearing will tend to rotate the sleeve 29 and consequently the slip ring 42 counterclockwise as viewed in Figure 3. This rotation releases the rollers 44 from their wedged position in the notches 43 and allows free movement of the slip ring relative to the bearing ring 32.

The unbalance created between the rotation of the ring gear 26 and the orbital rotation of the pinion 21 thus releases the overrunning clutch and allows the spider to float freely. The pinion and the sun gear merely becomes idlers, not being operative until the rotational balance is restored between the drive shaft and the driven shaft, whereupon the overrunning clutch acts to lock the sun gear and power is again transmitted thru the gearing as before. By shifting of the sleeve to lock the gearing for unitary rotation the speed change gear ratios with which the car is provided may be used as in ordinary driving.

I claim:

1. A transmission comprising a drive shaft, a driven shaft, a gear mounted for rotation with one of said shafts, a planet pinion mounted for movement with the other shaft and meshed with said gear, a fixed bearing ring, a slip ring journaled in said bearing ring, wedge means coacting with said rings for holding the slip ring against rotation in one direction, a sleeve slidably journaled on one of said shafts, a gear on the sleeve and meshed with the planet pinion, clutch teeth on the pinion mounting adapted to engage the sleeve gear, clutch teeth on the sleeve in mesh with complementary clutch teeth on the slip ring, and means for shifting the sleeve to disengage the clutch teeth on the sleeve from the clutch teeth on the ring and engage the sleeve gear with the clutch teeth on the pinion mounting.

2. A transmission comprising a drive shaft, a driven shaft, a ring gear mounted for rotation with the driven shaft, a spider mounted for rotation with the drive shaft, planet pinions journaled on the spider and meshed with the ring gear, a sleeve slidably journaled on the drive shaft, a sun gear on the sleeve and meshed with the pinions, a fixed bearing ring, a slip ring journaled in the bearing ring, means coacting with said rings for holding the slip ring against rotation in one direction, clutch teeth on the slip ring, clutch teeth on the sleeve adapted to mesh with the clutch teeth on the ring, clutch teeth on the spider adapted to mesh with the sun gear, and means for shifting the sleeve to optionally engage the clutch teeth on the sleeve with the clutch teeth on the slip ring or the sun gear with the clutch teeth on the spider.

3. A transmission comprising a drive shaft, a driven shaft, a gear mounted for rotation with one of said shafts, a planet pinion mounted for movement with the other shaft and meshed with said gear, a fixed bearing ring, a slip ring journaled in said bearing ring, wedge means coacting with said rings for holding the slip ring against rotation in one direction, a sleeve slidably journaled for movement axially of one of the shafts, a gear on the sleeve and meshed with the planet pinion, clutch teeth on the pinion mounting adapted to engage the sleeve gear, clutch teeth on the sleeve in mesh with complementary clutch teeth on the slip ring, and means for shifting the sleeve to disengage the clutch teeth on the sleeve from the clutch teeth on the ring and engage the sleeve gear with the clutch teeth on the pinion mounting.

4. A transmission comprising a drive shaft, a driven shaft, a gear mounted for rotation with one of said shafts, a planet pinion mounted for movement with the other shaft and meshed with said gear, a fixed bearing ring, a slip ring journaled in said bearing ring, means coacting with said rings for holding the slip ring against rotation in one direction, a sleeve slidably journaled for movement axially of one of the shafts, a gear on the sleeve and meshed with the planet pinion, clutch teeth on the pinion mounting adapted to engage the sleeve gear, clutch teeth on the sleeve in mesh with complementary clutch teeth on the slip ring, and means for shifting the sleeve to disengage the clutch teeth on the sleeve from the clutch teeth on the ring and engage the sleeve gear with the clutch teeth on the pinion mounting.

5. A transmission comprising a drive shaft, a driven shaft, a gear mounted for rotation with one of said shafts, a planet pinion mounted for movement with the other shaft and meshed with said gear, a fixed element, a rotatable element movable relative to said fixed element, means coacting with said elements for holding the movable element against rotation in one direction, a sleeve journaled for movement axially of one of the shafts, a gear on the sleeve and meshed with the planet pinion, clutch teeth on the pinion mounting adapted to engage the sleeve gear, clutch teeth on the sleeve in mesh with complementary clutch teeth on said movable element, and means for shifting the sleeve to disengage the clutch teeth on the sleeve from the clutch teeth on the movable element and engage the sleeve gear with the clutch teeth on the pinion mounting.

In testimony whereof, I have hereunto set my hand.

CHARLES E. STARR.